Figure 1:
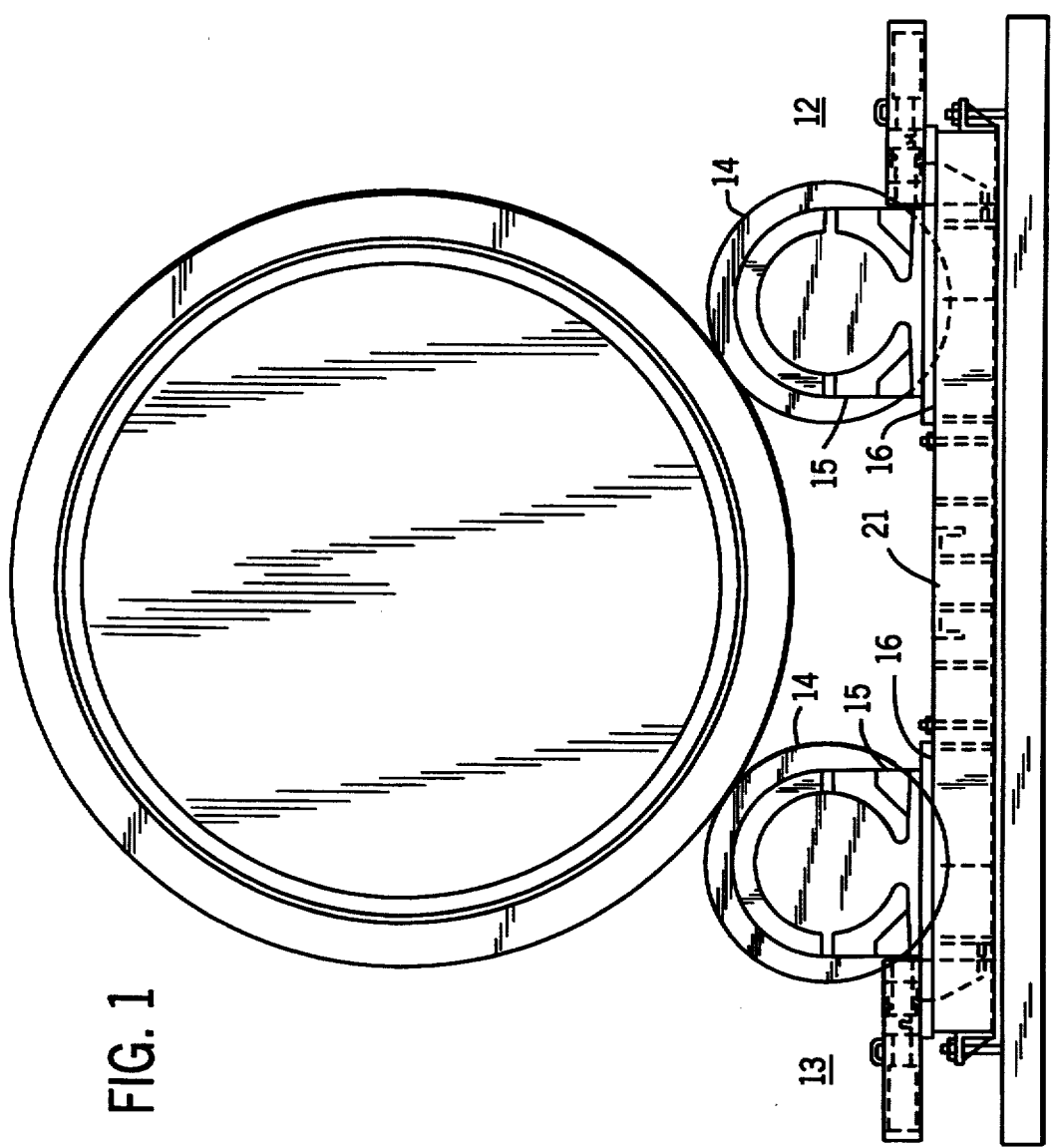

United States Patent [19]

Williams

[11] Patent Number: 5,429,440

[45] Date of Patent: Jul. 4, 1995

[54] MECHANISM FOR ADJUSTING THE POSITION OF SUPPORTS FOR LARGE ROTATING APPARATUS

[75] Inventor: John T. Williams, Wauwatosa, Wis.

[73] Assignee: Svedala Industries, Inc., Waukesha, Wis.

[21] Appl. No.: 266,523

[22] Filed: Jun. 28, 1994

[51] Int. Cl.⁶ ............................................. F16C 19/50
[52] U.S. Cl. .................................. 384/549; 384/583
[58] Field of Search ............... 384/549, 583, 519, 584, 384/556, 558

[56] References Cited

U.S. PATENT DOCUMENTS 3,501,906  3/1970  Wilhelmsen ..................... 384/549
3,648,992  3/1972  Durinck et al. .................. 384/549
4,552,508  11/1985  Reid ................................. 384/549
4,728,203  3/1988  Okamoto et al. ................ 384/549

Primary Examiner—Lenard A. Footland
Attorney, Agent, or Firm—Robert B. Benson

[57] ABSTRACT

This invention relates to a mechanism for adjusting the position of the roller bearings that support large rotating apparatus such as a rotary kiln. The mechanism utilizes a box like base mounted on the kiln foundation. The base has a pair of compartments. In the rear compartment a fluid pressure device actuates a piston to drive a threaded bolt against the base of the roller bearing to adjust its position. A stop nut on the threaded bolt is moved to engage a wall of the base to prevent movement of the bolt away from the bearing and thereby maintain the bearing in its adjusted position.

5 Claims, 3 Drawing Sheets

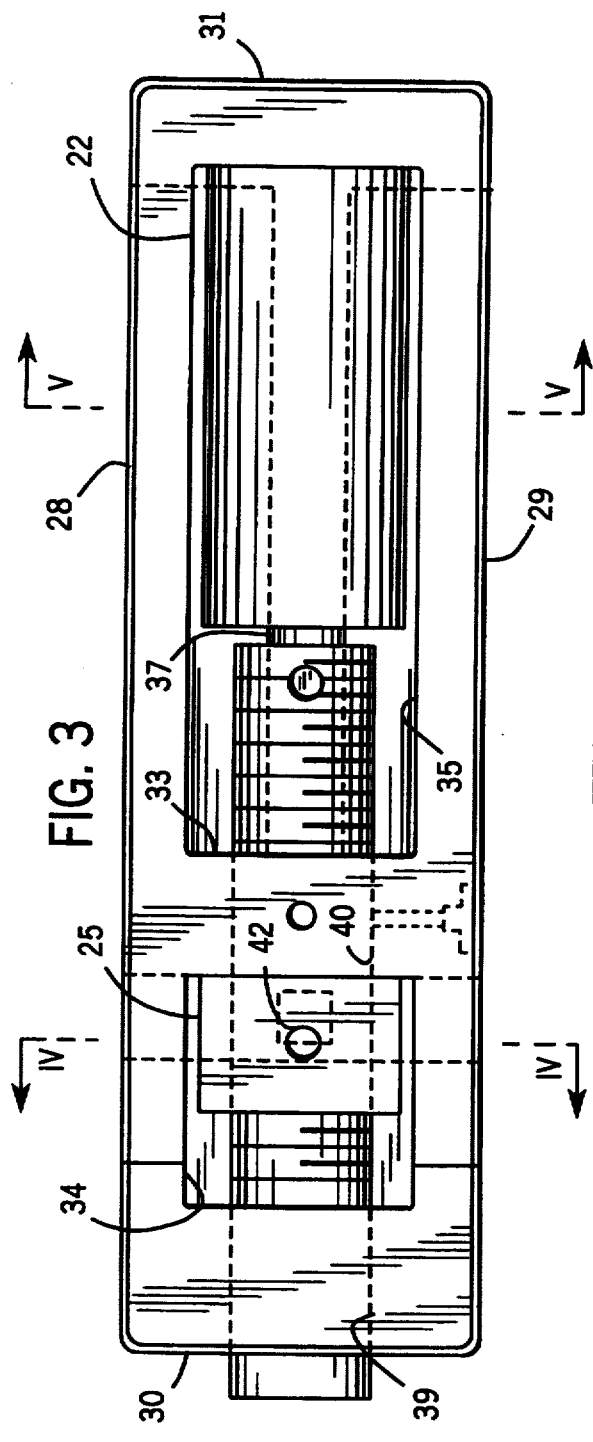
FIG. 3
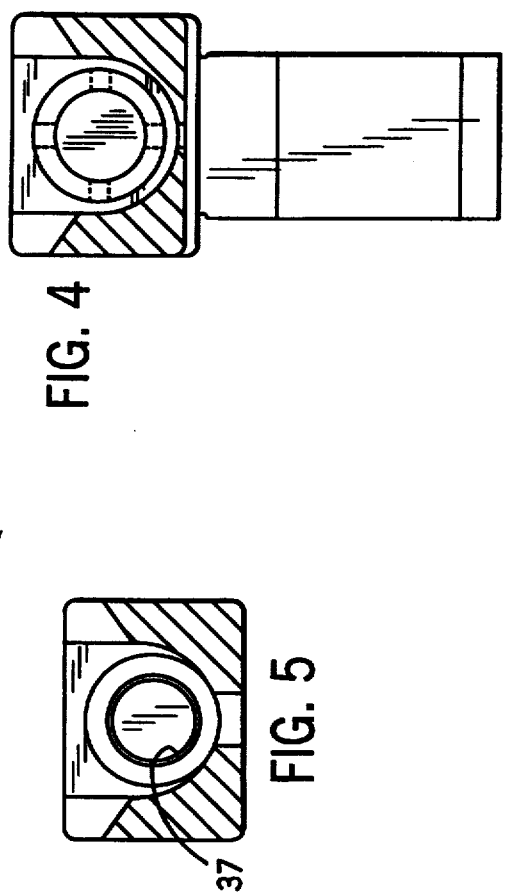
FIG. 4
FIG. 5

MECHANISM FOR ADJUSTING THE POSITION OF SUPPORTS FOR LARGE ROTATING APPARATUS

This invention relates to providing support for large tubular bodies such as rotary kilns and in particular to an arrangement capable of raising the kiln, aligning kiln supporting rollers and adjusting the distribution of load on kiln carrying supports.

According to a past practice in this art, the position of a kiln bearing assembly is adjusted by turning set screws to move the assembly relative to foundation structure. Because of the huge size of rotary kilns, it was necessary to turn such screws by applying a wrench and sledging them with a sledge hammer. As kilns are built over 600 feet long, more than 25 feet in diameter and often weigh in several hundred tons, it is difficult to achieve the desired adjustment by sledging.

It has been recognized for some time that fluid pressure could make easier the task of adjusting kiln bearing assemblies. One such application is disclosed in U.S. Pat. No. 3,174,810 A. J. Roubal. In that patent a fluid motor is provided having a cylinder anchored rigidly to the kiln foundation structure. A piston is arranged within the cylinder and a ram connected to the piston projects from the cylinder to engage a bearing assembly. The motor is arranged so that fluid pressure acting upon the side of the piston opposite the ram moves the piston, ram and assembly toward a vertical plane through the centerline of the kiln. Thus the fluid motor need provide force in but one direction as the weight of the kiln itself will provide force to move the bearing assemblies in the opposite direction. The ram is threaded and a stop nut is turned thereon external of a cylinder end wall through which the ram projects. After fluid pressure causes the motor to move a bearing assembly to a desired position, the nut is turned to engage the cylinder end wall. Thus although fluid pressure moved the bearing assembly to a new position, a mechanical stop (i.e., the nut engaging the cylinder end wall) holds the assembly in its new position. Once the nut engages the cylinder end wall, fluid pressure may be bled from the motor. A further advantage is that a single transportable source of fluid pressure is all that is required to serve the needs of even very large kilns. In many applications the position of the bearing assemblies have to be adjusted every six to twelve months.

The problem with the arrangement taught by Roubal is that when retrofitting existing kilns having set screw adjustment means there is not sufficient space for the stop nut and it is extremely difficult to reach the stop nut to move it to its new position.

This invention overcomes the problems at the prior art by moving the stop nut to a position within a separate housing mounted on the kiln base. In this way the housing including the fluid motor, can be mounted closer to the bearing assembly while the stop nut will be further away from the bearing assembly and thus make retrofitting existing kilns more practical.

Figure 2:
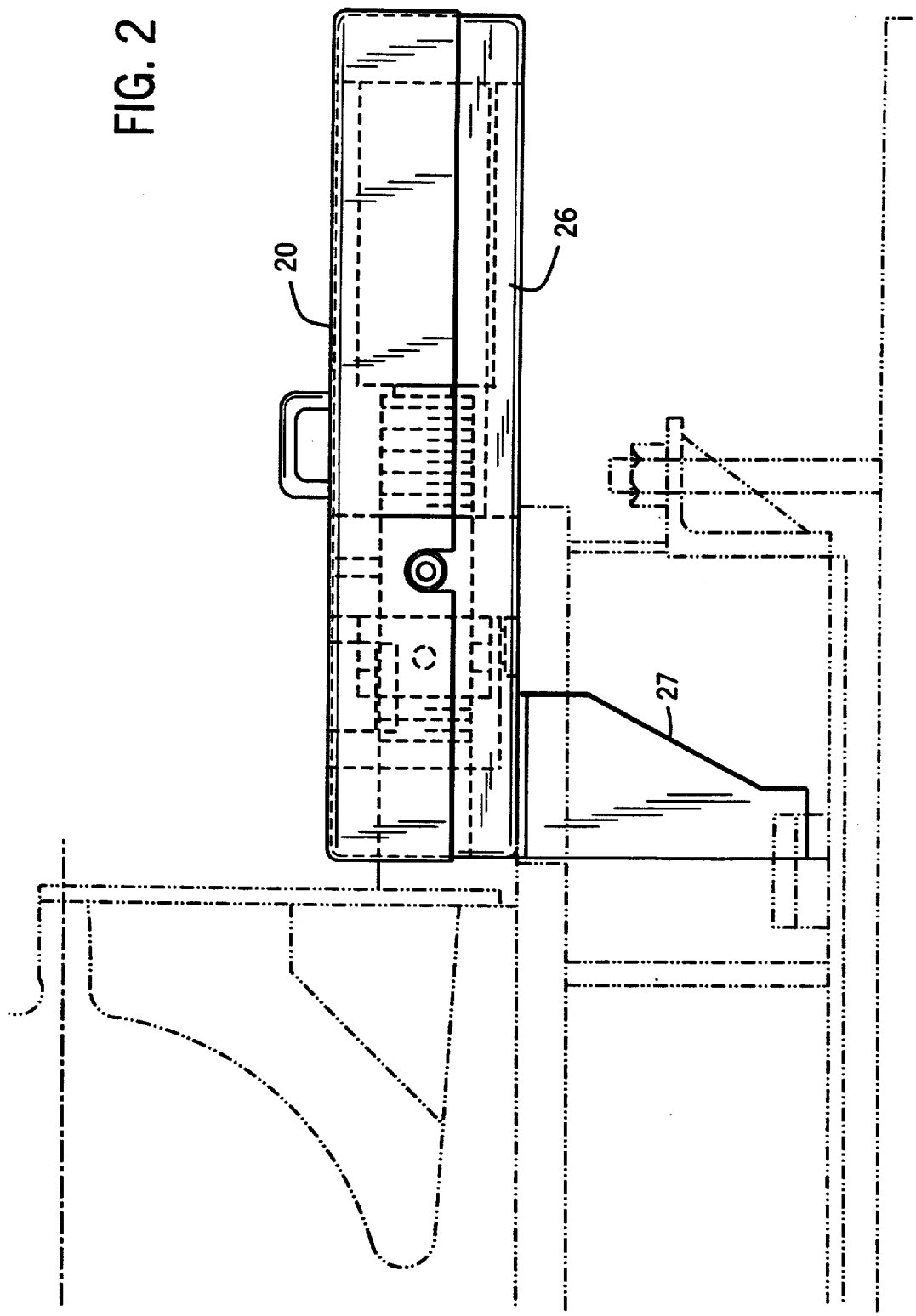

Other features and advantages of the invention will appear from the following more detailed description of the invention with reference to the accompanying drawing in which:

FIG. 1 is a cross sectional view through a kiln, the bearing assemblies and the adjusting mechanisms, of this invention, FIG. 2 is an enlarged cross sectional view of the adjusting mechanism, FIG. 3 is a top view of the adjusting mechanism, shown in FIG. 2, FIG. 4 is a view taken along the line IV—IV of FIG. 3; and FIG. 5 is a view taken along the line V—V of FIG. 3.

In the embodiment of the invention shown in the drawings, a tubular body such as a rotary kiln 10 is supported by a pair of what may be identical bearing assemblies 12 & 13. Each bearing assembly is provided with a roller bearing 14 journaled in a bearing support 15. The bearing support 15 is slidably mounted on a surface 16 of the foundation structure. On very large kilns high pressure grease fittings can be used to provide a film of grease beneath support 15 so the support may move with relative ease despite what may be enormous weight of the kiln 10 sometimes exceeding 900 tons.

The lug adjustment device of this invention comprises a housing 20 attached to the kiln base 21, a fluid motor 22 positioned in the housing a threaded bolt 23 extending through the housing from the fluid motor 22 to the bearing support 15, and a stop nut 25 on the bolt and positioned within the housing 20.

The housing 20 consists of a base 26 rigidly connected to the kiln support by any conventional means, such as embedding a flange 27 from the base 26 in the concrete kiln foundation. Two longitudinally extending side plates 28 and 29, are connected to the base 26 and two end plates 30 and 31, are connected to the base 26 and the side plates 28 and 29. A divider plate 33 is connected to the base 26 and side plates 28 and 29 to form forward and rear compartments 34 and 35. In practice the housing could be cast as a single unit.

The fluid motor 22 is positioned in the rear compartment 35. The motor can be of any suitable type consisting of a cylinder having a piston extending therefrom when fluid pressure is applied to the cylinder. The fluid motor can be permanently mounted in or be an integral part of the rear compartment or can be a portable unit that is placed in the rear compartment when it is to be used to move the bearing assembly. The motor 22 actuates a piston 37 to engage one end of a threaded bolt 38. The bolt extends from near the rear compartment 35 of the housing through axially aligned openings or holes 39 and 40 in end plate 30 and divider plate 33 to engage the bearing support 15. The fluid motor can apply up to 10,000 PSI against the piston to move the threaded bolt and the bearing assemblies.

A threaded portion of the bolt 23 lies within the forward compartment 34 of the housing, and a stop nut 25 is threaded on the portion of bolt within the compartment 34. The bolt could be up to 8 inches in diameter. The stop nut 25 is four to five inches long and is shown as annular rather than the more conventional hexagonal shape. In either case, radially extending holes 42 are formed therein to receive a long bar that functions as a lever to rotate and move the nut into position. If the fluid motor was a permanent installation, the piston could have a shaft that is threaded and extends far enough from the motor that it could replace the threaded bolt.

In operation, bearing assemblies 12 and 13 will tend to be moved apart from each other when a kiln is placed thereon. The bearing assemblies 12 and 13 will move apart until they each engage bolt 23. Continued movement of the bearing assembly after bearing support 15 engages bolt will move the bolt until the stop nut 25 engages divider plate 33. The position of all of the parts thus achieved can be expected to be initially at variance from that desired so at least some adjustment will be required. Adjustment is achieved by activating the fluid motor 22. Fluid pressure is applied by fluid motor 22 to move its piston 45 into engagement with the bolt 23. The bolt then moves the bearing assembly 12 or 13 in a direction opposite to that in which the assembly tends to move as a result of the downwardly force exerted on the bearing assembly by the weight of kiln 10. The movement of piston 45 and bolt 23 caused by fluid pressure will carry stop nut 25 away from divider plate 33. When the desired adjustment of the bearing assembly 12 has been achieved, stop nut 25 is turned about bolt 23 until nut 25 engages divider plate 33 to hold the bearing assembly in its adjusted position. The rotation of the stop nut 25 is accomplished by inserting a long rod into the holes 42 and using the rod as a lever to rotate the nut. When the nut is moved into its desired adjusted position, fluid pressure may be bled from the motor and the fluid pressure source may be moved to another bearing assembly to achieve similar adjustment of other kiln supports.

From the foregoing it will be understood that the present invention is possessed of unique advantages. However, such modifications and equivalents of the disclosed concepts such as readily occur to those skilled in the art are intended to be included within the scope of this invention and thus the scope of this invention is intended to be limited only by the scope of the claims such as are, or may hereafter be, appended hereto.

The embodiments of the invention in which an exclusive property or privilege is claimed are defined as follows:

1. In combination with a bearing assembly for supporting a tubular body for rotation about its central axis and upon its foundation by means including a pair of roller bearings arranged with one on each side of a vertical plane through the body axis and with each roller axis aligned parallel to the body axis, a support for each of said bearings slidably mounted upon a generally horizontal surface of said foundation, said support comprising: a fluid pressure operated mechanism for adjusting the position of said bearing assembly, said mechanism comprising a housing mounted on said foundation and spaced from said bearing assembly, said housing comprising a base connected to said foundation, two longitudinally extending side plates connected to said base, two end plates connected to said base and said side plates, and a divider plate connected to said base and said side plates to divide the housing into a forward compartment adjacent said bearing support and a rear compartment; a fluid motor positioned in said rear compartment and having a piston extending therefrom; axially aligned opening formed in said divider plate and said end plate adjacent said bearing assembly; a threaded bolt extending through the holes in said divider plate and said end plate to engage said piston at one end and said bearing support at the other end; a stop nut threaded on said bolt; whereby when said fluid motor is actuated said piston forces said bolt to slide said bearing support assembly toward said tubular body, and said stop nut away from said divider plate and when said nut is tightened against said divider plate it prevents movement of said bearing assembly toward said housing.

2. The combination of claim 1 in which said housing is a one piece casting.

3. The combination of claim 1 in which said fluid motor is an integral part of said rear compartment.

4. The combination of claim 3 in which said threaded bolt is an extension of said piston.

5. The combination of claim 1 in which said stop nut is cylindrical in shape and has a series of accurately spaced holes extending radially inward from the outer surface of said stop nut.

* * * * *